No. 667,836.  
F. W. WOOD.  
SHIP'S CLINOMETER.  
(Application filed May 23, 1900.)  
Patented Feb. 12, 1901.
(No Model.)
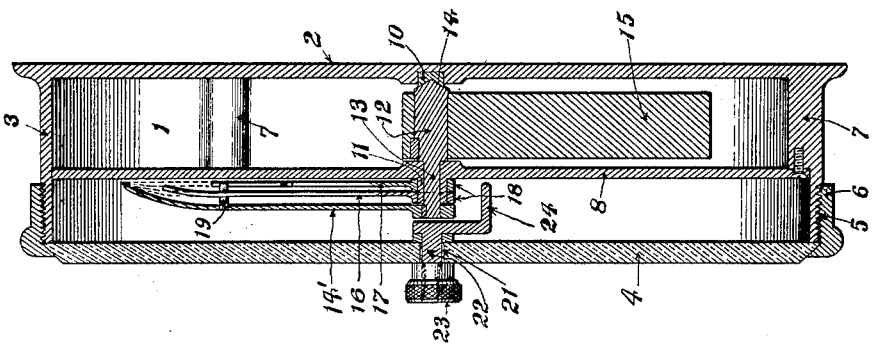
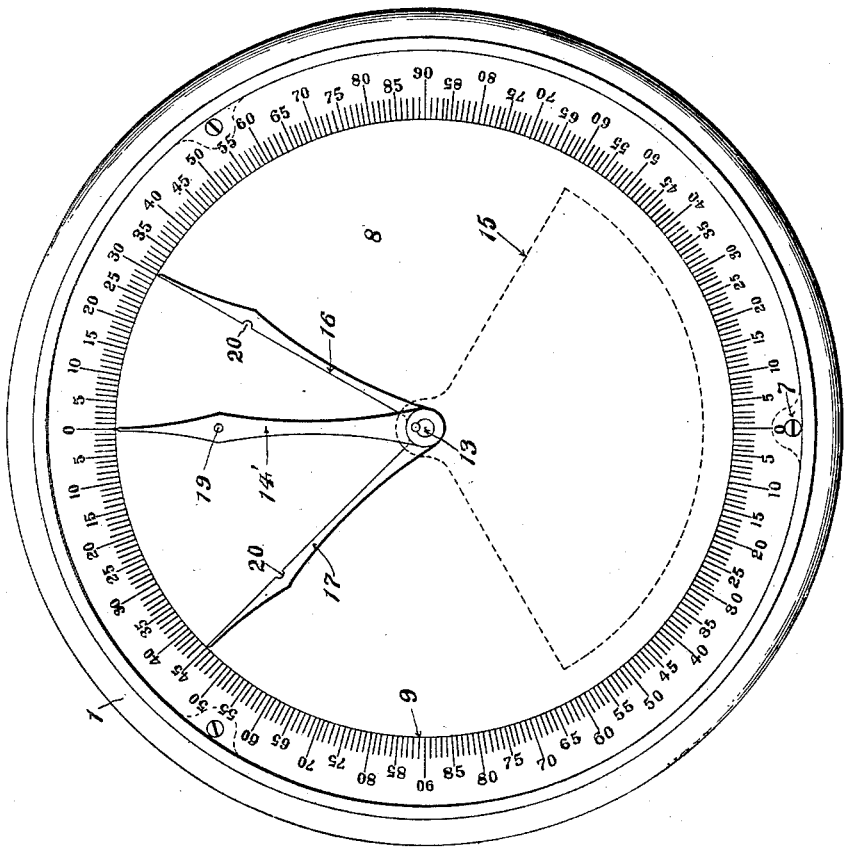
WITNESSES:  
Theo. L. Gatchel.  
Hugh S. Watson.
INVENTOR  
Frank W. Wood  
BY  
J. Granville Meyers  
ATTORNEY.
THE NORRIS PETERS CO., PHOTO-LITHO., WASHINGTON, D. C.

UNITED STATES PATENT OFFICE.

FRANK W. WOOD, OF NEWPORT NEWS, VIRGINIA.

SHIP'S CLINOMETER.

SPECIFICATION forming part of Letters Patent No. 667,836, dated February 12, 1901.

Application filed May 23, 1900. Serial No. 17,686. (No model.)

*To all whom it may concern:*

Be it known that I, FRANK W. WOOD, a citizen of the United States, residing at Newport News, Warwick county, Virginia, have invented certain new and useful Improvements in Ships' Clinometers, of which the following is a specification.

This invention relates to ships' clinometers, and has for one object to provide an extremely simple, inexpensive, and efficient instrument by means of which the maximum roll of a vessel or its maximum inclination to one side or the other from true perpendicular position will be automatically indicated in such manner that such maximum roll or inclination can be ascertained at any time after its occurrence.

It also has for one object to provide an instrument of the character referred to which will be extremely sensitive and accurate and which will not be affected by atmospheric changes, salt air, or the weather.

It has for its further object to provide novel and simple means for setting the indicator mechanism back to zero after the maximum roll or inclination of the ship has been observed and recorded.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a view in front elevation of my improved ship's clinometer, and Fig. 2 is a vertical central cross-sectional view thereof.

Referring to the drawings, the numeral 1 indicates an air and water tight casing comprising a base or back 2, a cylindrical body or rim 3, and a glass or other suitable transparent front or face 4. The body 3 of the casing is preferably exteriorly threaded at its outer end, as at 5, and over said threaded end is screwed an internally-threaded and flanged bezel 6, between which and the outer end or edge of the rim or body 3 the glass front 4 is tightly clamped. The joints of the casing or the points of juncture between its several parts should be joined together air and water tight to exclude moisture and the salt air, which would otherwise corrode the working parts and bearings of the instrument and seriously affect its accuracy.

Formed on the interior of the body 3 of the casing, intermediate its front and rear ends, is a shoulder 7, against which is fitted and secured by any suitable means a diaphragm or partition 8, and on the front or outer face of said partition is indicated or affixed a dial 9, the circumference of which is graduated to indicate one hundred and eighty degrees, the center of the upper portion of the dial being marked to indicate zero and the quadrants on each side thereof being marked to indicate successively in opposite directions ninety degrees.

Fitted centrally in the back or base 2 of the casing is a bushing or plug 10, provided on its inner end with a conical recess or step-bearing, as shown, and formed on the outer face of the partition 8, opposite said bushing or plug and in horizontal alinement therewith, is a hollow boss 11.

The numeral 12 indicates an arbor, on the forward end of which is formed a trunnion 13, which is journaled in the hollow boss 11, and on the opposite end of said arbor is formed a conical journal 14, which is journaled in the conical recess in the end of the bushing or plug 10. On the trunnion 13 is fixed an index or pointer 14', which normally projects perpendicularly above the arbor, and fixed on and pendent from said arbor is a weight 15, which, as shown, is preferably of the shape of a broad flat segment. The weight in practice should be made quite heavy relatively to the index-hand, so as to hold said hand perfectly perpendicular at all times and under all circumstances with certainty.

On the boss 11 are fitted two indicator-hands 16 and 17, said hands being each provided at its inner end with an eye or collar 18, which fits with sufficient friction on the boss 11 to permit of its movement on or about the latter, but will normally remain on said boss in any position to which it may be turned.

On the index or pointer 14' is fixed a rearwardly-projecting pin 19, and at corresponding points on the inner or adjacent faces of the indicator-hands 16 and 17 are formed semicircular notches or recesses 20, which embrace the pin 19 when the indicator-hands are brought into contact with each other to enable them both to be set to zero.

Formed centrally in the glass front 4 and in horizontal alinement with the boss 11 is a perforation 21, in which is journaled a short shaft 22, the outer end of which projects beyond the face of the front 4 and is threaded, as shown, and has fitted thereover a milled thumb-nut 23. The inner end of said shaft is provided with a cranked extension 24, the end of which projects between and in the path of rotation of the indicator-hands 16 and 17. The inner end of the shaft 22 lies in close proximity to the adjacent end of the trunnion 13 and not only serves to hold the arbor 12 to its bearing, but also prevents any endwise movement of the index or indicator hands on their axes.

The operation of my improved clinometer is as follows: The casing should be fixed to a suitable support on board the vessel in a true vertical position, and as long as the vessel sits or rests perfectly true in the water with its decks horizontal the index or pointer 14' will be held perfectly perpendicular by the weight 15 and will then point to zero on the graduated dial. The indicator-hands should then also be set to zero or brought into contact with each other in rear of the index or pointer, which can be quickly and conveniently accomplished in the manner and by the means hereinafter described. Should the vessel roll to one side or the other, the weight will maintain the index or pointer in its perpendicular position and prevent it from oscillating; but as the casing is fixed relatively to the vessel and the boss 11 partially rotates or oscillates with the vessel one or the other of the indicator-hands, as 17, for example, according to which direction the vessel rolls, will be prevented by the pin 19 from turning with the boss 11, while the other indicator-hand, as 16, will rotate with said boss and move away from the index or pointer. The index or pointer and the indicator-hand 17 will then, when the vessel is at its greatest inclination, point to the numeral or graduated mark on the dial to indicate in degrees the amount of heel or roll of the vessel, and the hand 16 will point to zero. When the vessel again assumes a perpendicular position, the index 14' will point to the zero-mark, and the indicator-hand 17 will indicate the list to port the vessel has immediately preceding made, while the hand 16 will register with and also point to zero. In the same manner the other indicator-hand 16 will automatically be moved to indicate the heel or roll of the vessel in the opposite direction, and both indicator-hands will remain opposite the graduated marks to which they have been moved by the greatest or maximum inclination or list of the vessel until again set to zero by hand, whereby they will register the extreme or maximum degree of list or roll of the vessel to both starboard and port in such manner that the same may be read at any time and recorded.

To set the hands to zero conveniently and quickly, it is only necessary to turn the milled nut 23 first in one direction and then the other, whereby the cranked extension 24 is first caused to engage and move one of the indicator-hands back to zero and then upon its reverse movement move the other indicator-hand to zero in like manner.

Having described my invention, what I claim is—

1. In a ship's clinometer, the combination with a graduated dial adapted to be mounted so as to partake of the movements of the ship, of two indicator-hands each frictionally journaled at its lower end centrally of the dial so as to move therewith but capable of being moved on its mounting independent of the dial, a pointer pivoted concentric with the indicator-hands, and weighted so as to maintain a true perpendicular position at all times, and a pin carried by the pointer and projecting between the said indicator-hands, said hands being arranged to alternately engage the pin on the pointer as the ship lists or rolls and rotate the hands on their mountings so that the free ends thereof will be moved over the dial.

2. In a ship's clinometer, the combination with a casing provided with a graduated dial, of a pointer or index weighted to maintain a perpendicular position, a boss arranged centrally of the dial, two indicator-hands fitted on said boss and normally moving therewith but adapted to be independently turned thereon, a projection carried by the pointer or index and arranged to alternately engage said indicator-hands as the ship rolls or lists and move them over the dial, and means for engaging and resetting the indicator-hands to zero at will by hand, substantially as described.

3. In a ship's clinometer, the combination with a casing provided with a graduated dial, of an arbor pivoted centrally relatively to said dial, a pointer or index fixed on said arbor, a weight fixed on and pendent from the arbor, two indicator-hands independently journaled on a fixed support carried by the dial, a pin carried by the pointer or index and projecting between said indicator-hands, said pin operating to alternately engage the said indicator-hands as the ship rolls or lists and move them over the dial and about the said fixed support on which they are mounted, substantially as described.

4. In a ship's clinometer, the combination with a casing provided with a vertical partition bearing on its outer face a graduated dial, of an arbor provided at its rear end with a conical journal stepped in a conical bearing fixed in the back of the casing and provided at its front end with a trunnion journaled in a hollow boss on the front face of the partition, two indicator-hands journaled on said boss a pointer or index fixed on said trunnion, a pendent weight fixed on the arbor, a shaft journaled in front of the dial in alinement with the trunnion and provided with a cranked extension projecting in the path of the indicator-hands, and means for alternately turning said shaft in opposite directions to return said indicator-hands to zero-point, substantially as described.

5. In a ship's clinometer, the combination with a casing provided with a graduated dial, of an arbor pivoted centrally relatively to said dial, a pointer or index fixed on said arbor, a weight fixed on and pendent from the arbor, a boss centrally arranged on the dial concentric with the arbor, two indicator-hands independently journaled on the boss, a pin carried by the pointer or index and projecting between said indicator-hands, said pin operating to alternately engage the indicator-hands as the ship rolls or lists and move them over the dial, a shaft journaled in front of and in alinement with the arbor and provided at its inner end with a cranked extension projecting in the path of the indicator-hands, and means for turning the shaft alternately in opposite directions to return said indicator-hands to zero-point, substantially as described.

6. In a ship's clinometer, the combination with a closed casing having a transparent front and provided interiorly with a central partition bearing a graduated dial on its front face, of a weighted pointer freely suspended within the casing to maintain a true perpendicular position, a circular boss arranged centrally on the face of the partition, two indicator-hands frictionally mounted on said boss and normally moving therewith and with the casing but adapted to be independently turned thereon, and means carried by the pointer or index and arranged to be alternately engaged by said indicator-hands as the ship rolls or lists to move them over the dial, substantially as described.

7. In a ship's clinometer, the combination with a closed casing having a transparent front and provided interiorly with a central partition bearing on its front face a graduated dial, of an arbor journaled at its rear end in a bearing in the back of the casing and provided at its front end with a trunnion journaled in and extending through a hollow boss on the front face of the partition, a pointer on the end of said trunnion, a pendent weight fixed on the arbor and serving to maintain the pointer in a true perpendicular position at all times, and two indicator-hands frictionally mounted on said hollow boss and normally moving therewith and with the casing but adapted to be independently turned thereon by engagement with the pointer as the ship lists or rolls to move said hands over the dial.

8. In a ship's clinometer, the combination with a casing provided with a graduated dial, of two indicator-hands mounted so as to move with the dial but capable of being moved independently thereof, a pointer or index weighted to maintain a true perpendicular position at all times, a projection carried by the pointer or index and arranged to alternately engage said indicator-hands as the ship lists or rolls and move them over the dial, and means for engaging and resetting the indicator-hands to zero at will, substantially as described.

9. In a ship's clinometer, the combination with a graduated dial mounted so as to partake of the movement of the ship and provided with a central boss formed integral therewith, of a pair of indicator-hands frictionally journaled on said boss, a weighted pointer pivoted concentric with the indicator-hands and retained normally in a perpendicular position, and a pin carried by said pointer and alternately engaged by said hands when the ship lists or rolls to rotate and move the hands over said dial.

10. In a ship's clinometer, the combination with a closed casing having a transparent front, and a graduated scale, of a weighted pointer journaled within the casing to maintain a true perpendicular position at all times, of a pair of indicator-hands frictionally mounted within the casing, said hands normally moving with the casing but adapted to be moved independent thereof, means carried by the pointer arranged to be alternately engaged by said indicator-hands as the ship lists or rolls to move them over the scale, a shaft journaled in the said transparent front and provided on its inner end with means for engaging and resetting the indicator-hands to the zero-point, and means for turning said shaft, substantially as described.

In testimony whereof I have hereunto set my hand in presence of two subscribing witnesses.

FRANK W. WOOD.

Witnesses:
THEO. L. GATCHEL,
J. E. WARREN.